(12) United States Patent
Kurtz et al.

(10) Patent No.: US 7,975,552 B2
(45) Date of Patent: *Jul. 12, 2011

(54) PRESSURE TRANSDUCER EMPLOYING A MICRO-FILTER AND EMULATING AN INFINITE TUBE PRESSURE TRANSDUCER

(75) Inventors: Anthony D. Kurtz, Saddle River, NJ (US); Nora Kurtz, legal representative, Saddle River, NJ (US); Tonghuo Shang, Basking Ridge, NJ (US); Adam Hurst, Slate Hill, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/719,789

(22) Filed: Mar. 8, 2010

(65) Prior Publication Data
US 2010/0175482 A1    Jul. 15, 2010

Related U.S. Application Data

(63) Continuation-in-part of application No. 12/315,614, filed on Dec. 4, 2008, now abandoned.

(51) Int. Cl.
*G01L 9/00*    (2006.01)
(52) U.S. Cl. ............................. 73/706; 73/716
(58) Field of Classification Search .................. None
See application file for complete search history.

(56) References Cited

U.S. PATENT DOCUMENTS

| 5,587,601 | A | * | 12/1996 | Kurtz | 257/417 |
| 5,770,806 | A | * | 6/1998 | Hiismaki | 73/861.29 |
| 5,939,639 | A | * | 8/1999 | Lethbridge | 73/724 |
| 6,070,469 | A | * | 6/2000 | Taniguchi et al. | 73/720 |

* cited by examiner

*Primary Examiner* — Andre J Allen
(74) *Attorney, Agent, or Firm* — James E. Schutz, Esq.; Dean Y. Shahriari; Troutman Sanders LLP

(57) ABSTRACT

It is an objective of the present invention to provide a pressure transducer assembly for measuring pressures in high temperature environments that employs an elongated tube which is terminated at one end by an acoustic micro-filter. The micro-filter has a plurality of apertures extending from one end to the other end, each aperture is of a small diameter as compared to the diameter of the transducer and the damper operates to absorb acoustic waves impinging on it with limited or no reflection. To improve the absorption of acoustic waves, the elongated tube may be tapered and/or mounted to a support block and further convoluted to reduce the overall size and mass of the device. A pressure transducer with a diaphragm flush may be mounted to the elongated tube and extend through to the inner wall of the tube. Hot gases propagate through the elongated tube and their corresponding pressures are measured by the transducer. The acoustic filter operates to absorb acoustic waves resultant from the hot gases, therefore enabling the pressure transducer to be mainly responsive to high frequency waves associated with the gas turbine operation.

20 Claims, 7 Drawing Sheets

131   132   133   134

PRESSURE TRANSDUCER EMPLOYING A MICRO-FILTER AND EMULATING AN INFINITE TUBE PRESSURE TRANSDUCER

CROSS-REFERENCE TO RELATED APPLICATIONS

This application is a continuation-in-part claiming priority under 35 U.S.C. §120 to U.S. patent application Ser. No. 12/315,614, entitled "PRESSURE TRANSDUCER EMPLOYING A MICRO-FILTER AND EMULATING AN INFINITE TUBE PRESSURE TRANSDUCER," filed Dec. 4, 2008, which is not abandoned and is a continuation application claiming priority under 35 U.S.C. §120 to U.S. Pat. No. 7,484,415, entitled "PRESSURE TRANSDUCER EMPLOYING A MICRO-FILTER AND EMULATING AN INFINITE TUBE PRESSURE TRANSDUCER," issued on Feb. 3, 2009, all of which are incorporated by reference in their entirety as if fully set forth herein.

TECHNICAL FIELD

This invention relates to pressure transducers and more particularly to a pressure transducer incorporating a micro-filter replacing the prior art infinite tube.

BACKGROUND

Aerodynamic engineers have long desired to measure high frequency flow and pressure disturbances in gas turbine engines and aircraft wings. The capability was made possible with extremely compact pressure transducers fabricated from micro-machined silicon. The frequencies of concern were for example, in the tens of thousands of kilohertz (kHz). As such, Kulite Semiconductor Products, Inc., the assignee herein, has developed many transducers which operate to measure such pressure disturbances in gas turbine engines and aircraft wings. Such devices are the subject matter of various patents that describe their operation and fabrication. See, for example, U.S. Pat. No. 6,612,178 entitled "Leadless Metal Media Protected Pressure Sensor" issued on Sep. 2, 2003 to A. D. Kurtz et al. and assigned to the assignee herein. See also, U.S. Pat. No. 6,363,792 entitled "Ultra High Temperature Transducer Structure" issued on Apr. 2, 2002 to A. D. Kurtz et al. and assigned to the assignee herein. In any event, as will be explained, there are certain situations where mounting of the transducer becomes extremely difficult.

For example, in order to determine the pressure and high frequency flow in gas turbines, a recessed pipe is attached to the combustion chamber that allows the hot gases within the chamber to cool before reaching the sensor. While the pipe does successfully cool the gases, it also reduces the bandwidth of the pressure measurement because of the generation of harmonic frequencies. Similar to blowing air over the top of an open bottle, the air inside the recessed pipe will be compressed by the air jet back out of the recess. In essence, the air inside the bottle acts as a spring. The oscillations of the air inside the recess results in a resonant frequency similar to that of an organ pipe. Such vibrations make measuring the pressure and flow of the gases within the combustion chamber of the gas turbine difficult. As will be explained, in the prior art, a long, curled tube (or "infinite tube") has been used to remove such resonances. However, such a solution requires many feet of tubing and very accurate coiling of the tube. Further difficulties associated with the prior art include the lack of access for mounting such transducers in a turbine case, as well as problems which involve discriminating against low and high frequencies.

An alternative mechanism that overcomes one or more of these problems is desirable.

BRIEF SUMMARY OF INVENTION

The various embodiments of the present invention provide a pressure transducer assembly for measuring pressure in high temperature environments, wherein acoustic waves are minimized to enable an accurate pressure measurement over a large bandwidth.

The various embodiments of the present invention include an elongated tube having a first end adapted to receive an incoming pressure source and a second end wherein a micro-filter, operative to substantially dampen or absorb incoming acoustic waves, is disposed. The elongated tube may have a constant cross-section area or may taper from a first cross-section area at the first end to a second, smaller, cross-section area at the second end. Additionally, the elongated tube may be independent or machined into a support block. Further, the elongated tube may be convoluted to reduce the overall size and mass of the device. The elongated tube may also have a mounting surface positioned near the first end wherein a pressure transducer assembly may be mounted and adapted to measure the pressure of the incoming pressure source.

DETAILED DESCRIPTION OF PREFERRED EMBODIMENTS

Figure 1:
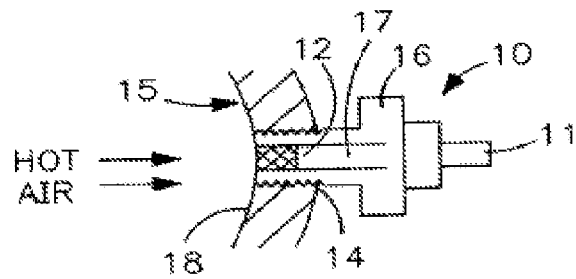
FIG. 1 depicts a prior art technique of mounting a pressure transducer to a turbine casing designated as a flush mount condition.

Referring to FIG. 1, there is shown a prior art technique depicting a typical installation which is employed in the aerodynamics industry. In FIG. 1, reference numeral 15 represents a gas turbine casing. The gas turbine casing is typically found in a gas turbine engine. The operation of such an engine is attendant with extremely high temperatures which are directed to the casings. There is shown a transducer 10 which is mounted on a housing 16. Housing 16 is threaded and essentially threads into a threaded aperture which is formed in the turbine casing 15. Located remote from the transducer 10 is a sensing diaphragm 12. The sensing diaphragm 12 as seen in FIG. 1 is responsive to the pressure created by the hot air gases associated with the turbine which therefore causes the diaphragm 12 to deflect and produces a pressure response from the transducer which is coupled thereto via the tube cavity 17. The cable 11 directs the output from the transducer 16 to various monitoring equipment as is well known. As indicated, FIG. 1 shows a typical installation with the transducer 10 installed on the gas turbine case 15. The close coupling of the transducer sensing diaphragm 12 which is flush mounted with the inner wall surface 18 of the turbine case gives a relatively good measurement frequency. The upper limit of the frequency being the sensor resonant frequency, is typically in the hundreths of KHz. The diaphragm 12 basically is flush with the inner wall 18 of the turbine casing. However, there are certain situations where the flush mount is not possible.

Figure 2:
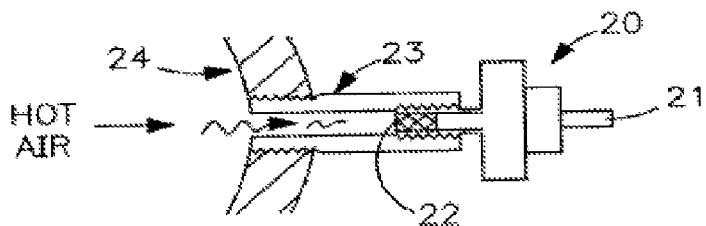
FIG. 2 depicts an alternate method of mounting a pressure transducer to a turbine casing using an elongated tube.

Referring to FIG. 2, there is shown a more typical installation where the transducer 20 must be recessed some distance away from the turbine case 24. The reasons for such a recess include lack of access, but most often this is due to the extremely high turbine gas temperature pressure compressor temperatures which can be as high as 2000° C. These temperatures require use of the elongated tube 23. In modern aircraft engines the compressor air temperature reaches about 700° C. and the combustor gas temperature can be as high as about 2000° C. The latter temperature is beyond the capabilities of even the most advanced piezoresistive transducers. Thus, the measurement of pressure at these high temperatures involves a recessed installation with the transducer and pressure source separated by a pipe or tube 23 so that the transducer is located in a somewhat cooler ambient area. As seen in FIG. 2, the pipe 23 extends from the gas turbine case 24 and now accommodates the transducer 20, the cable 21 and the diaphragm 22. The diaphragm 22 is remote from the casing 24 (as compared to FIG. 1). An example of a transducer 20 is the high temperature miniature IS pressure transducer manufactured and sold by Kulite Semiconductor Products, Inc. as the XCEL-072 series. Such transducers are about 0.075 inches (0.075") in diameter. The pipe 23 while not shown to scale in FIG. 2 is essentially an organ pipe with a finite length. This reduces the measurement frequency due to organ pipe harmonic frequencies, defined as $f=c/4L$, where f is equal to the frequency, c is equal to the velocity of the hot air and L is the length of the pipe. As is known, the recess pipe reduces the measurement frequency based on pipe harmonic frequencies as defined by the above equation and high harmonics. For example, a one inch long organ pipe-filled with air has a resonant frequency of about 3.3 kHz representing an acoustic wave bouncing back and forth between the organ pipe ends. The usable frequency is even less, by about a factor of 5, to about 60 Hz, which is too low for most gas turbine applications. To overcome this limitation, a technique known as infinite tube pressure transducer solves the organ pipe frequency limitation.

Figure 3:
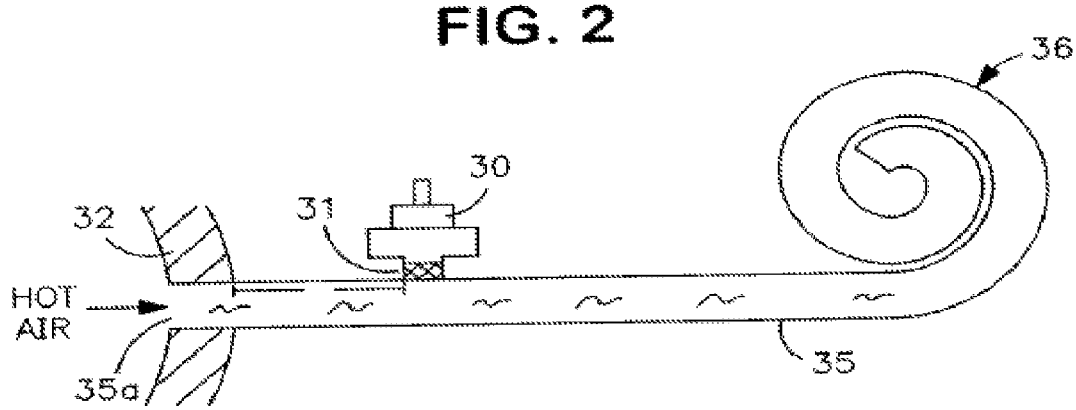
FIG. 3 depicts still another technique of mounting a pressure transducer to a turbine casing using a coiled tube or infinite tube array.

Referring to FIG. 3, a transducer 30 is installed on the side wall of the so called infinite tube 35. The transducer is installed some distance D away from the hot gas inlet, typically a distance of about one to six inches, with longer distances if the gas temperature is higher. The tube 35 is coupled to the gas turbine case 32 via an aperture. The hot air enters the tube at inlet 35a and the tube has an end which essentially is coiled as indicated by reference numeral 36. The acoustic waves as generated from the source, enter the tube 35 and travel to the transducer location with little or no attenuation. Because there is basically no reflection off the far end, the transducer measurement will not be contaminated with organ pipe harmonics and thus will measure static and dynamic pressure to higher frequencies than achievable in installations such as those depicted in FIG. 1 and FIG. 2. This arrangement allows the transducer to be positioned in a cooler location, therefore, allowing pressure measurements at very high gas temperatures. In situations where dynamic pressure at the transducer location is attenuated, calibration curves can be used to correct the measurement data. The infinite tube which typically can be 30 to 1000 feet long, is packaged into a cylindrical bundle as indicated by reference numeral 36 to the size of about 2 to 3 inches in diameter, and 3 to 5 inches long. As one can ascertain, this cylindrical bundle is rather large, compared for example, to the dimensions of the transducer 30 associated with the deflection diaphragm 31. For example, a typical IS transducer as indicated above, is about 0.375 inches in length and has a diameter of about 0.075 inches. Thus, as one can ascertain, the infinite tube package is quite large compared to the size of the transducer. The infinite tube package is also cumbersome to handle in practice. For example, slight kinks in the tube cause undesirable acoustic reflections. Therefore, great care must be taken in coiling the tube into a cylindrical bundle. It is thus preferable to use small diameter tubes for ease of packing and low weight. However, better performance results if the sensing diaphragm is as close to the tube's inner wall as possible, thus avoiding sharp edges and cavities. The edges and cavities are sources of acoustic reflection. For this reason, larger diameter tubes or tubes of oval cross section are more desirable so that small diameter (e.g., 0.075 inch) transducers can be used. Practically, the infinite tube diameter is a compromise between these two constraints, and is typically about 0.125 inches in diameter. Thus, even with optimum packaging, typical infinite tube transducers are size and weight limited. They are prone to damage by shock and vibration typically found in gas turbine test environments. It is well known that instrumentation engineers prefer not to use these transducers whenever an alternative method is available. Because of these limitations, the infinite tube transducer is used by few of the world's gas turbine manufacturers. For example, of the particular uses of infinite tubes, reference is made to two pending applications, entitled "Low-Pass Filter Semiconductor Structures for Use in Transducers for Measuring Low Dynamic Pressures in the Presence of High Static Pressures" by A. D. Kurtz et al. and assigned to the assignee herein, and "Improved Pressure Transducer for Measuring Low Dynamic Pressures in the Presence of High Static Pressures" also by A. D Kurtz and assigned to the assignee herein. The above-identified applications describe infinite tube transducers and essentially the characteristics and operation of such tubes in frequency responsive applications.

Figure 4:
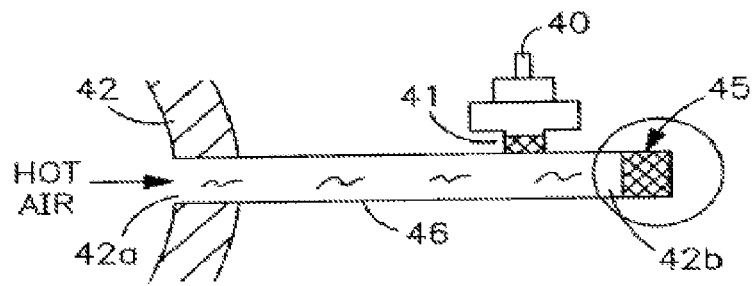
FIG. 4 depicts a pressure transducer mounted to a turbine casing employing the micro-filter according to an embodiment of the present invention.

Referring now to FIG. 4, there is shown schematically an apparatus according to an exemplary embodiment of the present invention which essentially eliminates the infinite tube bundle depicted in FIG. 3. According to an aspect of the present invention, a micro-filter 45 essentially mimics the effects and benefits associated with the infinite tube structure illustrated in FIG. 3. The micro-filter 45 operates to dampen or absorb acoustic waves impinging on it with limited or no reflection. One way of achieving a micro-filter is to use a wafer of silicon with micro-pores etched from the wafer. The micro-pores are small in diameter so as to maximize viscous damping effects. Because the acoustic waves are likely to bounce off solid surfaces, the micro-filter surface facing the flow should be as small as possible and of course include pores or apertures in the surface. As shown in FIG. 4, a tube 46 is coupled to the turbine casing and allows hot air to enter the front opening 42a. The transducer 40 is remotely located from the turbine casing and is placed on the surface of the tube 46 with the sensing diaphragm 41. Following and terminating the infinite tube at the back opening 42b is the micro-filter 45. The micro-filter replaces the very long tube as indicated in FIG. 3, achieving substantial size and weight reductions. A number of unanticipated benefits are derived from this construction.

Figure 5:
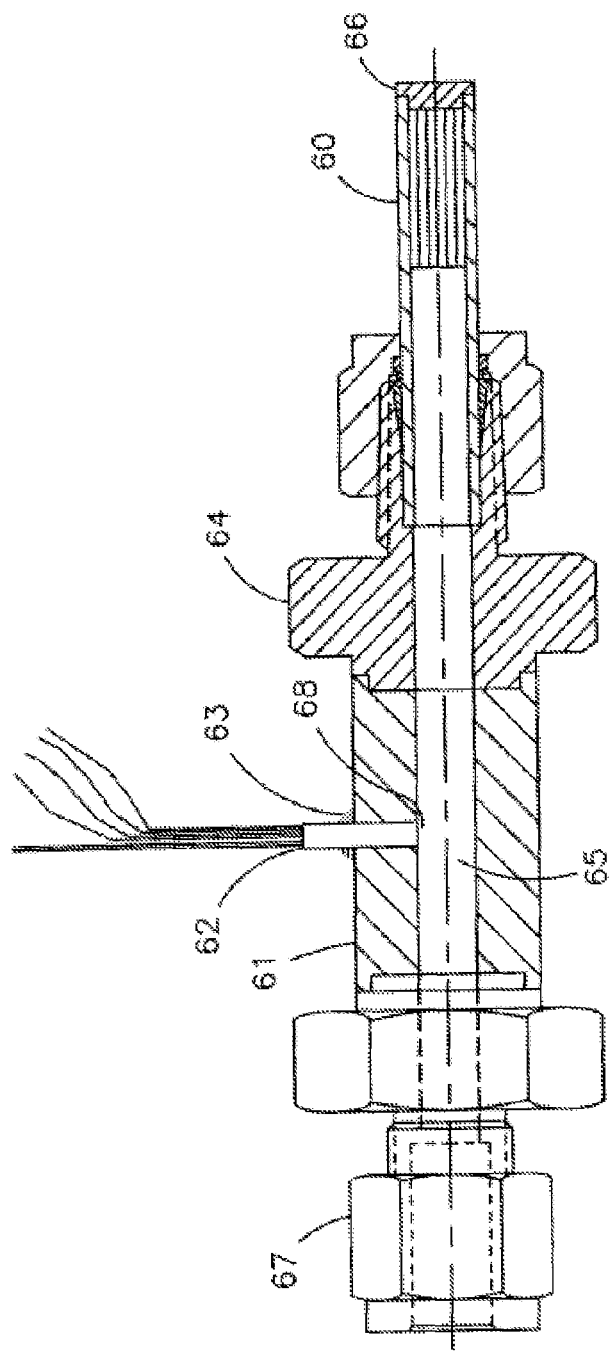
FIG. 5 shows a pressure transducer utilizing a micro-damper or filter according to an embodiment of the present invention.

Referring to FIG. 5, there is shown a cross-sectional view of a transducer assembly utilizing a micro-filter 60. The micro-filter 60 can be fabricated by a number of techniques, including, for example, use of a silicon wafer having suitable pores etched therein. In another embodiment, the micro-filter or damper can be a compilation of micro-glass tubes, preferably about 0.5 to 6 inches in length. One can use an additional porous silicon wafer to increase damping. A single glass tube array or a single porous silicon wafer can alternatively be used. Further, shown in FIG. 5 is a pressure transducer assembly with a housing 61. The housing 61 contains the pressure transducer 62 with the diaphragm end of the transducer 68 located within the cavity 65 of the housing assembly 61. The cavity 65 extends from one opened end to the other opened end, where the other opened end is terminated with the micro-filter 60 and has an end cap 66. A mounting arrangement indicated generally as reference numeral 67 is shown for mounting the entire unit to a suitable structure, and includes fitting screws and/or other well know connectors. Such mounting arrangement is well known and further description is omitted herein for brevity.

Figure 7:
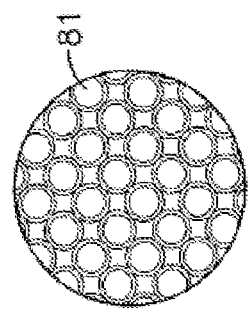
FIG. 7 shows an enlarged view of the array of pores or apertures in the micro-filter.
Figure 6:
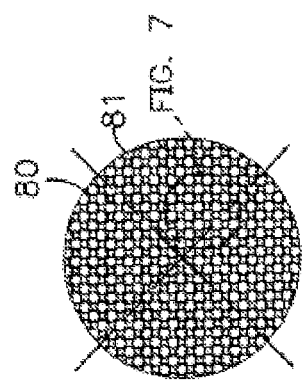
FIG. 6 shows a front view of a micro-filter according to an embodiment of the present invention.

Referring to FIG. 6, there is shown a cross-sectional view of the micro-filter or damper 60 depicted in FIG. 5. As one can ascertain there are a plurality of small apertures 81 which extend from one end of the damper 80 to the other end. FIG. 7 shows an enlarged view of the apertures in FIG. 6. As one will understand, the micro-filter 60 can be fabricated from silicon and one can etch apertures shown in FIG. 6 and FIG. 7 into the silicon by conventional etching techniques. The etching of silicon and formation of apertures in silicon is well known. The acoustic filter 60 is fabricated by the packing small diameter glass tubes which basically are stacked within an outer shell or housing depicted by reference numeral 80 of FIG. 6. The outer diameter of the glass tubes may vary between about 0.005 inches and 0.02 inches with the inner diameter varying between about 0.004 inches and 0.015 inches. The tubes are about 0.5 to 6 inches in length. The variation of diameters is a function of the frequencies to be accommodated. Thus, the glass tube matrix array as shown in FIGS. 6 and 7 illustrate configuration(s) employed with the glass tubes abutting against one another. The glass tubes are conventionally joined together under heat and one then extrudes the bundle to produce the array. A wafer of silicon can be utilized with the apertures directed from a first to a second surface of the silicon, or both devices can be employed together.

In any event, the present invention has many advantages which are not accommodated by the prior art techniques. For example, the size and weight of the unit, in contrast to the unit of FIG. 3, are greatly reduced by at least one order of magnitude. The device shown in FIG. 5 is easier to handle and less susceptive to shock and vibration damage and represents a more viable device for wide spread use in gas turbine testing or laboratory research. The device further extends the high frequency pressure measurement capability in extremely high temperature and high vibration environments. Still further, larger diameter coupling tubes can be used without significant size and weight boundaries because the very long infinite tube is eliminated and a compact micro-filter (as for example 60 depicted in FIG. 5) is employed. The pressure transducer 62, for example, having a 0.075 inch diameter housing as seen in FIG. 5, is flush mounted to the tube 65 inside wall with little or no step cavity. This is depicted in FIG. 5 wherein the diaphragm portion 68 of the transducer 62 is flush with the inner wall of the internal tube cavity 65. The larger diameter reduces viscous damping as pressure waves travel to the transducer along the tube. Both factors lead to better pressure measurements, in terms of both accuracy as well as frequency range. The pressure measurements using such a technique will include both static and dynamic pressure when a piezoresistive pressure transducer is employed for transducer 62. Also, as new high temperature piezoresistive transducers are developed, the distance between the transducer and the hot gases can be reduced, thus allowing pressure measurements to be made with better accuracy and higher frequency.

While it is clear that the above noted damper operates at substantially reduced organ pipe resonance, the use of the glass tube embodiment as for example shown in FIG. 7 experiences certain problems. While the damper depicted in FIGS. 6 and 7 operates favorably, it has one particular problem, in that based on the large surface area between tubes, acoustic waves can be reflected by this configuration and hence, the reflected acoustic waves produce undesirable resonances or pressure oscillations, which is not optimal for certain applications. The optimal result is to have a filter which has a zero impedance operating in an acoustic channel for replacement of the infinite tube pressure transducers. In the embodiment depicted in FIGS. 6 and 7, the acoustic wave will impinge on the flat surface that exists between the glass tubes. Thus, even if the cylindrical surface contains a large number of holes through which some of the sound waves can pass, the remaining flat surface which basically is provided by the area between the tubes operates as an acoustic reflecting surface.

In FIG. 8 there is shown again a bundle of glass tubes which basically form a cylindrical member 80 which is approximately a quarter of an inch in diameter D and which contains approximately 20 to 40 through holes, each of which are about 10 mils in diameter. In regard to this configuration, one then utilizes a conically shaped diamond impregnated coring tool. This coring tool operates to enlarge each hole on the surface on which the acoustic wave will impinge. In one exemplary configuration depicted in FIG. 8, a conical tube has a diameter D1 of 0.100 inches tapering down to D2 0.025 inches over a length of 0.150 inches. Each hole is enlarged with the tube and essentially the resulting structure presents a zero acoustic impedance. With the input acoustic wave directed towards the conical openings 91 and 92, there is very little area for which the wave to be reflected. Hence, the wave is absorbed and enters each of the conical apertures 91 and 92 and travels down the respective tube 90 which operates to again damp.

Figure 8:
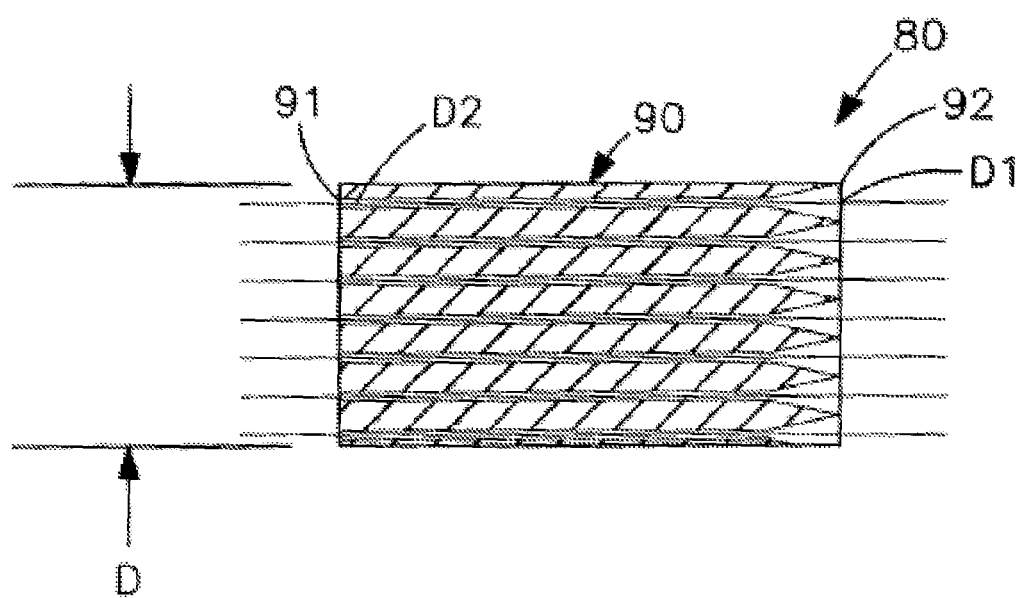
FIG. 8 shows a micro-filter having tapered apertures.

While the embodiment shown in FIGS. 6 and 7 operates, it does not operate as efficiently as the embodiment depicted in FIG. 8. The embodiment depicted in FIG. 8 eliminates resonances due to reflections off the front surface of the damper. For example, in regard to the damper shown in FIGS. 6 and 7 utilizing an overall cylindrical diameter of 0.25 inches and having 31 holes in the glass cylindrical member each hole having a diameter of 12 mils, this allows an open area equal to 7.14%. This open area is small and therefore there is a large amount of reflection from the front surface of the damper causing less than optimum performance. In regard to the configuration shown in FIG. 8 utilizing the same number of holes, the initial diameter due to the coring now is 38 mils and reduces to a diameter of 12 mils. This creates a conical hole entrance which basically results in a zero impedance structure. As there is very little surface area for which the acoustic wave to reflect from, the acoustic wave enters the conical apertures and is absorbed within the conical tube. It is noted that the conical apertures taper from a front opening towards the back during a predetermined portion of the tube. This taper can be changed or varied. In any event, as indicated above, the taper extends about 0.15 to 0.25 inches along the length of the tube. Each tube is typically 0.5 to 6 inches in length. It is of course understood that the length and the diameter of the apertures can vary dependent upon the frequencies to be accommodated. While the use of micro-machined silicon can be employed as the micro-filter, other materials can be used, such as micro-machined glass or micro-machined silicon carbide. Thus, the acoustic filter can be employed and fabricated utilizing many different materials.

Although the various embodiments of the micro-filter presented above, with and without a conical entrance, substantially dampen acoustic waves that interfere with pressure transducer measurements, the micro-filters still exhibit a slight impedance change that results in some reflection of acoustic waves in the tube. These reflections give rise to a low-level acoustic pipe resonance that amplifies and attenuates the pressure measurement made by the transducer. These reflections are undesirable. Hence, the purpose of the exemplary embodiments hereinafter described is to reduce these reflections.

Figure 9:
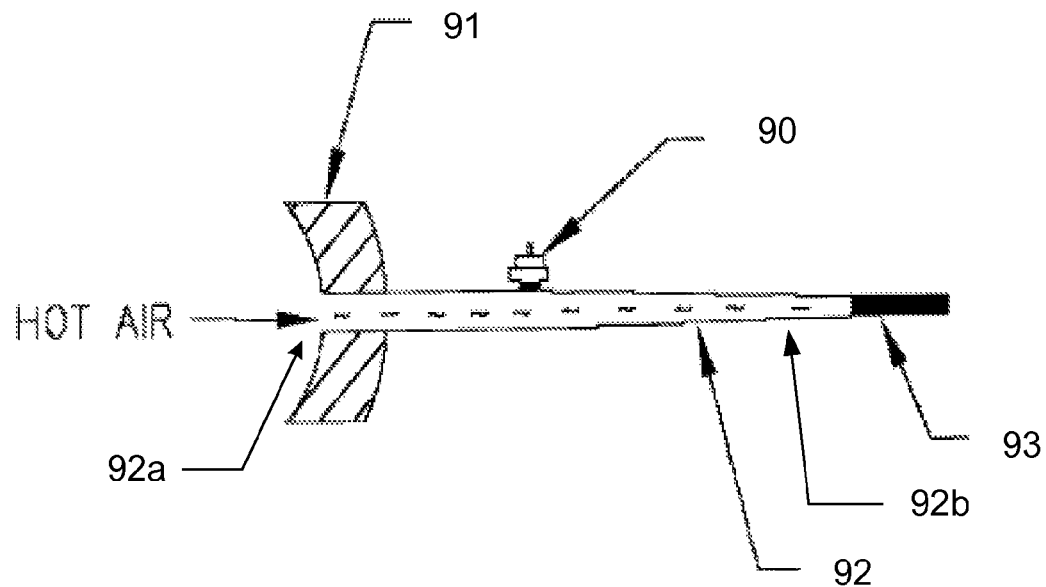
FIG. 9 is an illustration of an exemplary embodiment of the present invention wherein an elongated tube is linearly tapered.
Figure 10:
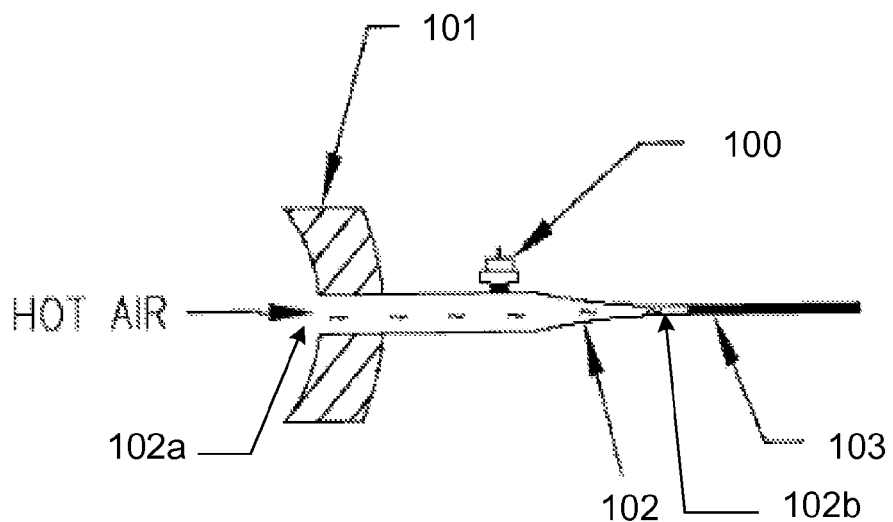
FIG. 10 is an illustration of an exemplary embodiment of the present invention wherein an elongated tube is exponentially tapered.

FIG. 9 is an illustration of an exemplary embodiment of the present invention wherein a tube 92 is elongated and tapered. Lengthening the tube 92 eliminates organ pipe frequencies that arise from the impedance mismatch between the tube 92 and the micro-filter 93. Those skilled in the art will appreciate that lengthening the tube 92 also increases viscous dissipation along the tube 92. Thus, any low magnitude acoustic waves reflected off the entrance of the micro-filter 93 because of the impedance mismatch are attenuated before reaching the pressure transducer 90. Those skilled in the art will appreciate that tapering the elongated tube 92 also improves viscous dissipation. It is important, however, that the decrease in diameter of the tube 92 is gradual such that the tapering does not cause acoustic reflections. In an exemplary embodiment of the present invention, the elongated tube 92 is linearly tapered, as shown in FIG. 9. Alternatively, the elongated tube 102 may be exponentially tapered, as illustrated in FIG. 10. One of ordinary skill in the art will further appreciate that the dimensions of the micro-filter may be adjusted to cooperate with said tapering. Additionally, in another exemplary embodiment, the viscous dissipation of the elongated tube may be further enhanced by increasing the surface roughness of the tube.

These exemplary embodiments enable a pressure transducer mounted onto the elongated tube to capture the static and dynamic pressure measurements occurring within the high temperature environment without interference from acoustic waves caused by impedance mismatches between the tube and the micro-filter.

Figure 11:
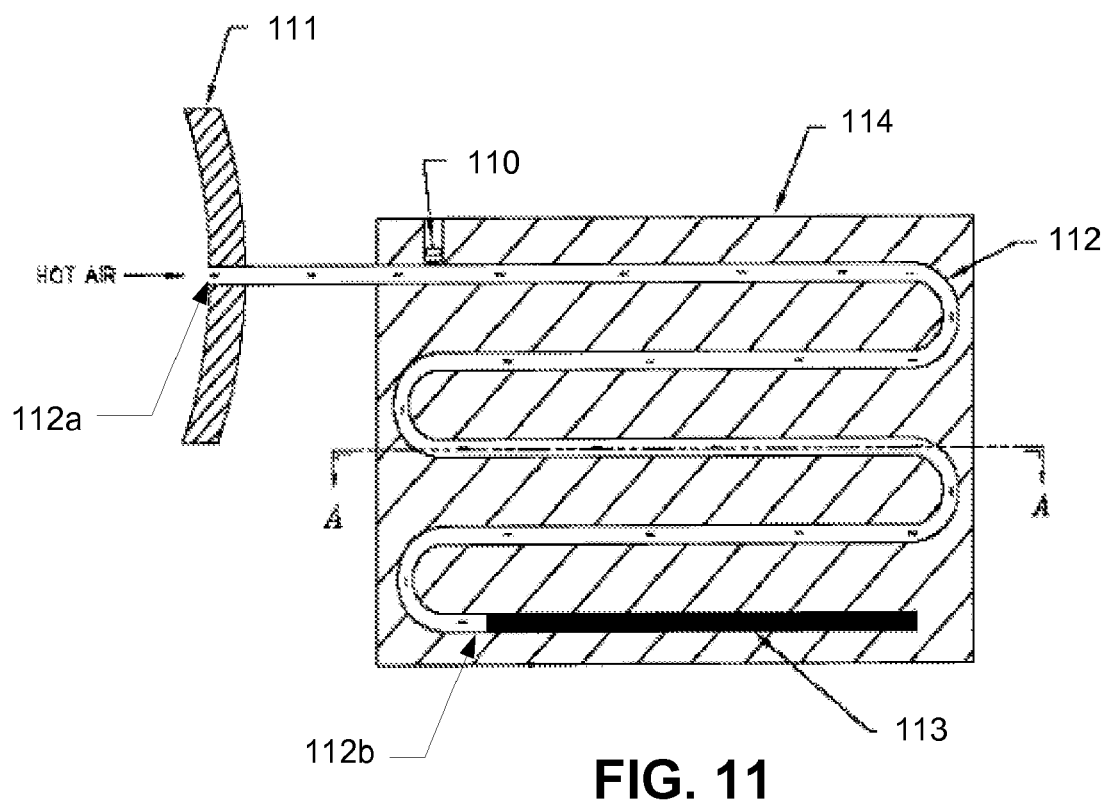
FIG. 11 is an illustration of an exemplary embodiment of the present invention showing an elongated tube machined into a support block, a transducer mounted onto the elongated tube, and a micro-filter disposed at the end of the elongated tube.

FIG. 11 is an illustration of another exemplary embodiment wherein an elongated tube 112 is etched or mechanically machined into a support block 114. The support block 114 is preferably made of metal, glass, or silicon. However, in other embodiments different materials may be used. This elongated tube 112 has a first end 112a and a second end 112b. The first end 112a serves as an input for hot gases emanating from the gas turbine. A micro-filter 113, such as those previously described, is disposed proximate the second end 112b of the elongated tube 112. The micro-filter 113 may be secured to 112 using high temperature cement, epoxy, or some other high temperature adhesive. A pressure transducer 110 is placed on the surface of the tube 112 some distance away from the hot gas inlet 112a, as previously described.

Figure 12:
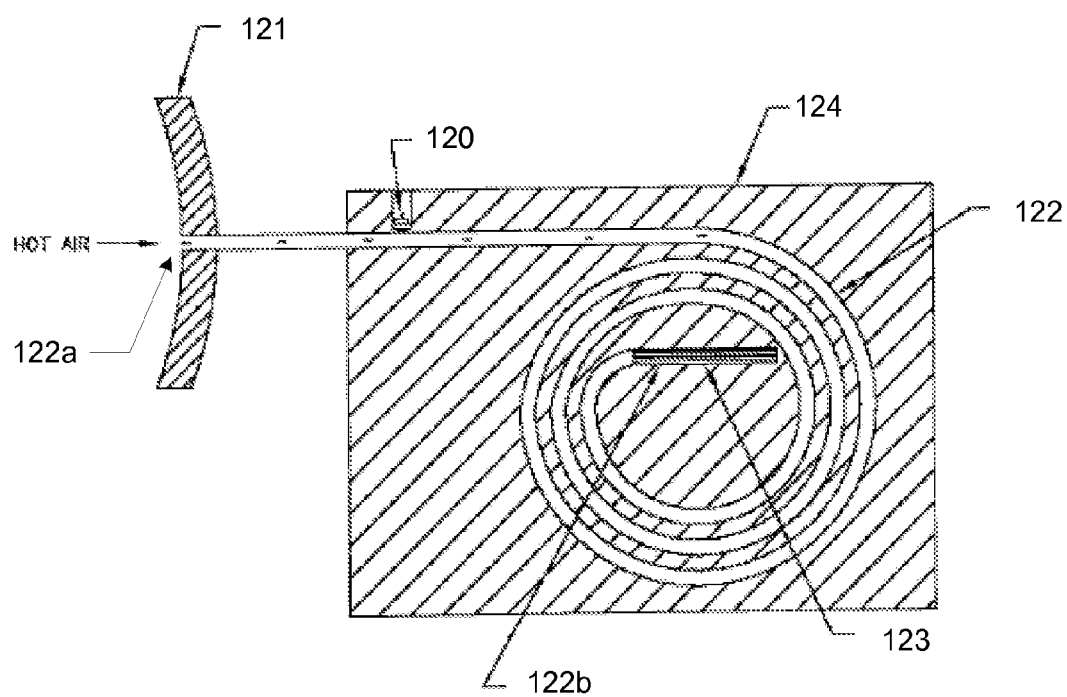
FIG. 12 is an illustration of another exemplary embodiment of the present invention showing an elongated tube machined into a support block, a transducer mounted onto the elongated tube, and a micro-filter disposed at the end of the elongated tube.

The elongated tube 112 may be machined into a support block 114 using a computer numerical controlled (CNC) machine or micromachined using photolithographic techniques. These techniques also enable the elongated tube 112 to be convoluted into specific patterns. It is preferred that the elongated tube 112 is convoluted as the convolution achieves the desired elongation of the tube, as previously discussed, and enables the support block 114 to be compact, therefore reducing the overall size and mass of the assembly. In a preferred embodiment, the elongated tube 112 is convoluted into a serpentine-shaped pattern, as illustrated in FIG. 11. In another preferred embodiment, the elongated tube 122 is convoluted into a coiled-shape pattern, as illustrated in FIG. 12. However, in other embodiments the elongated tube may be convoluted differently.

Figure 13:
FIG. 13 illustrates preferred cross-sections of the elongated tube.

Those skilled in the art will appreciate that the overall geometry of an elongated tube can also affect acoustic resonances and reflections. Accordingly, FIG. 13 illustrates preferred cross-sections of the elongated tube. In a preferred embodiment of the present invention, the overall geometry of the elongated tube is squared 131, rectangular 132, or oval 134. These preferred embodiments provide the added advantage of reducing acoustic resonances or reflections. In prior embodiments, a transducer, which is cylindrical with a flat face, was mounted perpendicular to the axis of a circular 133 pipe. However, this geometry mismatch causes reflections due to the small cavity that results between the face of the transducer and the circular outer wall of the pipe when the transducer is installed. In the exemplary embodiments wherein the elongated tube is squared 131, rectangular 132, or oval 134, the transducer can be flush mounted to the side of the tube without a geometry mismatch, thereby improving the frequency response of the device. These additional embodiments enable high frequency measurements in high temperature environments without acoustic wave reflections.

Figure 14:
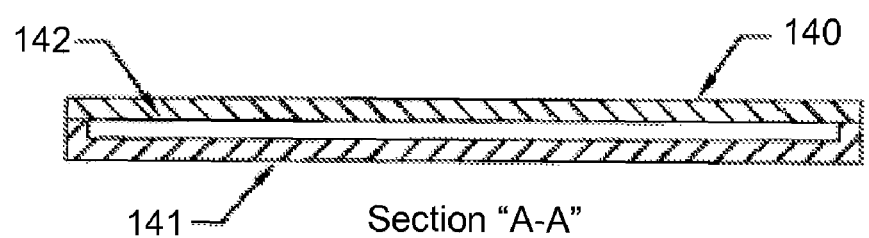
FIG. 14 is a cross-sectional view illustration of an elongated tube machined into a support block wherein a cover is disposed on the top surface of the support block.

In another preferred embodiment, the elongated tube, micro-filter, and pressure transducer may be covered by mounting or bonding a cover onto the support block. FIG. 14 is a cross-sectional view illustration of an elongated tube 142 machined into a support block 141 wherein a cover 140 is disposed on the top surface of the support block. This cover 140 is preferably made of metal, however it may also be made of glass, silicon, quartz, or silicon carbide. However other materials for the cover may be used in different embodiments.

It will be apparent to those skilled in the art that modifications and variations may be made in the apparatus and process of the present invention without departing from the spirit or scope of the invention. It is intended that the present invention cover the modification and variations of this invention provided they come within the scope of the appended claims and their equivalents.

We claim:

1. A pressure transducer assembly for measuring pressure in high temperature environments comprising:
   a support block having a first surface;
   an elongated tube machined into said first surface of the support block, wherein the elongated tube has a first end adapted to receive an incoming pressure source and a second end; and
   a micro-filter disposed proximate the second end of the elongated tube, wherein the micro-filter is operative to absorb incoming acoustic waves associated with said pressure source applied to said first end of the elongated tube.

2. The pressure transducer assembly of claim 1, further comprising a pressure transducer disposed on a mounting surface of the elongated tube positioned near said first end, wherein the pressure transducer extends past the mounting surface into the elongated tube and is adapted to measure pressure of the incoming pressure source.

3. The pressure transducer assembly of claim 1, further comprising a cover disposed on the top surface of the support block.

4. The pressure transducer assembly of claim 3, wherein the cover is metal, glass, silicon, quartz or silicon carbide.

5. The pressure transducer assembly of claim 1, wherein the elongated tube tapers from a first cross-section area at the first end to a second cross-section area at the second end.

6. The pressure transducer assembly of claim 5, wherein the elongated tube tapers linearly.

7. The pressure transducer assembly of claim 5, wherein the elongated tube tapers exponentially.

8. The pressure transducer assembly of claim 1, wherein the elongated tube is convoluted into a pattern.

9. The pressure transducer assembly of claim 1, wherein the elongated tube has a square cross-section.

10. The pressure transducer assembly of claim 1, wherein the elongated tube has a rectangular cross-section.

11. The pressure transducer assembly of claim 1, wherein the elongated tube has a circular cross-section.

12. The pressure transducer assembly of claim 1, wherein the support block is metal.

13. The pressure transducer assembly of claim 1, wherein the support block is glass.

14. The pressure transducer assembly of claim 1, wherein the support block is silicon.

15. A pressure transducer assembly for measuring pressure in high temperature environments comprising:
   an elongated tube having a first opened end and a second opened end wherein the tube tapers from a first cross-section area at the first opened end to a second cross-section area at the second opened end;
   a pressure transducer mounted on a surface of said tube and extending in to the tube opening to allow said transducer to measure a pressure applied to said tube via said first opened end, said pressure obtained from a pressure source to be monitored; and
   a micro-filter mounted and positioned in said second opened end and operative to absorb incoming acoustic waves associated with said pressure source applied to said first opened end.

16. The pressure transducer assembly of claim 15, wherein the elongated tube is linearly tapered.

17. The pressure transducer assembly of claim 15, wherein the elongated tube is exponentially tapered.

18. A method of making a pressure transducer assembly for measuring pressure in high temperature environments comprising the steps of:
   machining an elongated tube into a first surface of a support block wherein the elongated tube has a first end adapted to receive an incoming pressure source and a second end; and
   disposing a micro-filter proximate the second end of the elongated tube, wherein the micro-filter is operative to absorb incoming acoustic waves associated with said pressure source applied to said first end of the elongated tube.

19. The method of claim 18, further comprising the step of:
   disposing a pressure transducer onto a mounting surface of the elongated tube positioned near said first end wherein the pressure transducer extends past the mounting surface into the elongated tube and is adapted to measure pressure of the incoming pressure source.

20. The method of claim 18, further comprising the step of:
   disposing a cover on the top surface of the support block.

* * * * *